ated Mar. 17, 1959

United States Patent Office

2,878,292

PURIFICATION OF BOURBONAL

Jonas Kamlet, New York, N. Y., assignor to Crown Zellerbach Corporation, San Francisco, Calif., a corporation of Nevada No Drawing. Application June 20, 1955
Serial No. 516,796

2 Claims. (Cl. 260—600)

This invention relates to a process for the manufacture of bourbonal. More particularly, it relates to a process whereby vanillin (m-methoxy, p-hydroxybenzaldehyde), which is readily preparable from several inexpensive raw materials, may be converted to bourbonal (m-ethoxy, p-hydroxybenzaldehyde).

Vanillin (m-methoxy, p-hydroxybenzaldehyde) is a widely used flavoring and perfuming agent occurring naturally in the vanilla bean. It can be prepared synthetically from eugenol (oil of cloves), safrole (oil of sassafras), piperonal (heliotropin) and from guaiacol. It can also be prepared inexpensively and in huge volumes from plentiful industrial wastes and by-products of the pulp and paper industries (such as woodflour, sawdust, sulfite waste liquor, calcium lignosulfonate, alkali lignin, etc.) by alkaline oxidative scission processes. Bourbonal (m-ethoxy, p-hydroxybenzaldehyde) on the other hand, has no counterpart in nature. It is a pure synthetic which possesses a finer and more intense vanilla odor and taste than vanillin. The aroma of bourbonal is richer than that of vanillin and it "stays" longer. In flavoring and perfuming practice, bourbonal has three to four times the strength of vanillin. It is widely used under the name of ethavan, vanillose, ethyl vanillin and vanirome.

It is therefore the purpose of this invention to provide a process whereby vanillin (and especially the crude and not further refined vanillin obtained by the alkaline oxidative scission of lignin-based raw materials at low cost) may be converted to the superior flavoring and perfuming compound bourbonal.

The basis of my invention may best be understood by a seriatim description of the steps thereof:

(a) Vanillin is demethylated by reaction with an ether-cleaving reagent from the group consisting of compounds of the general formula RX where R is an equivalent of a member of the group consisting of hydrogen, organic primary, secondary and tertiary ammonium, aluminum, zinc, iron, tin, antimony and boron, and X is a halogen, to obtain a product consisting predominantly of protocatechuic aldehyde (3,4-dihydroxybenzaldehyde);

(b) The demethylation product of step (a) is now reacted with an ethylating agent from the group consisting of the ethyl halides, diethyl sulfate and the alkali metal ethyl sulfates, in the presence of an alkali from the group consisting of sodium hydroxide and the sodium alcoholates, in a medium consisting of a member of the group consisting of methanol, ethanol, n-propanol and isopropanol containing from zero to 50% by volume of water, to obtain an ethylation product consisting predominantly of a solution of bourbonal, and thereafter adjusting the reaction of the medium to between pH 8.5 and pH 9.0, whereby the bourbonal is selectively precipitated as the sodium acid salt of m-ethoxy, p-hydroxybenzaldehyde, and is thereafter separated from the solution containing the concomitant by-products of the demethylation of step (a) and the ethylation of step (b); and (c) acidifying the separated sodium acid salt of m-ethoxy, p-hydroxybenzaldehyde in an aqueous medium to obtain free bourbonal.

*Step (a).—Demethylation of vanillin.*—As a raw material, vanillin derived from any source may be used. Ideally suited is the crude vanillin, without further purification, obtained by the oxidative alkaline scission of lignin-containing raw materials.

The demethylation is effected by heating the vanillin, in a suitable solvent or medium, with an ether-cleaving agent such as the hydrogen halides (hydrogen chloride, hydrogen bromide, hydrogen iodide), the organic primary ammonium halides (such as aniline hydrochloride, ethanolamine hydrochloride), the organic secondary ammonium halides (such as dimethylamine hydrobromide, N-ethylaniline hydrochloride), the organic tertiary ammonium halides (such as pyridine hydrochloride, the hydrochlorides of the picoline-lutidine fraction of coal tar distillate) and the halides of aluminum, zinc, iron, tin, antimony and boron (such as anhydrous $AlCl_3$, $AlBr_3$, $ZnCl_2$, $SnCl_4$, $SbCl_5$, $BF_3$).

Best results are obtained by the use of demethylating agents of hydrogen chloride, hydrogen bromide, aluminum chloride, aluminum bromide, aniline hydrochloride and pyridine hydrochloride.

The demethylation is effected by heating vanillin in a suitable medium or solvent with at least a reacting proportion of the ether-splitting reagent, at a temperature between 50° C. and 250° C., whereupon it is converted to protocatechuic aldehyde and the methyl halide, which distills off during the reaction. A wide group of media or solvents may be employed for effecting this demethylation of the vanillin, including water, acetic acid, benzene, nitrobenzene, methanol, ethanol, n-propanol and isopropanol. It is also feasible to effect this demethylation by fusing the vanillin, in the absence of a solvent, with the ether-splitting reagent whenever said reagent is not volatile at the temperature of the demethylation (e. g. 50°–250°). Thus vanillin may be demethylated to protocatechuic aldehyde by heating in the absence of a solvent with aniline hydrochloride, pyridine hydrochloride, aluminum chloride, zinc chloride, at 50°–250° C., until methyl halide evolution is complete.

The reaction product of the demethylation step consists predominantly of protocatechuic aldehyde (85%–95%) with minor amounts of unreacted vanillin. The reaction product is freed of concomitant ether-cleaving reagent (e. g. by slurrying in water in which such ether-cleaving reagents are soluble, and filtering off the protocatechuic aldehyde) and is then employed in the second step of the process.

*Step (b).—Ethylation of protocatechuic aldehyde.*—The demethylation product of step (a) (consisting predominantly of protocatechuic aldehyde with minor amounts of unreacted vanillin) is now ethylated by reaction with a member of the group consisting of ethyl chloride, ethyl bromide, ethyl iodide, diethyl sulfate and the alkali metal ethyl sulfates. It is desirable to employ no more than one mole-equivalent of ethylating agent for each mole of protocatechuic aldehyde, to avoid the undesirable formation of diethylation products (e. g. 3,4-diethoxybenzaldehyde). If less than one mole-equivalent of ethylating agent is employed per mole of protocatechuic aldehyde, undesirable diethylation products are largely avoided, but at the expense of obtaining a lower yield of bourbonal.

However, in the preferred embodiment of this invention, any diethylated protocatechuic aldehyde obtained in the process, as well as any unreacted protocatechuic aldehyde resulting from the use of a stoichiometric deficit of ethylating agent are both recoverable and may be recycled to the process to make more bourbonal. Thus, for optimum efficiency, it is desirable to employ one mole-equivalent of ethylating agent for every mole equivalent of protocatechuic aldehyde.

The ethylation is effected in the presence of an alkali from the group consisting of sodium hydroxide, sodium methylate, sodium ethylate, sodium n-propylate and sodium isopropylate which may be employed in amounts varying from 0.5 to 3.0 moles per mole of protocatechuic aldehyde. However, to avoid diethylation of the protocatechuic aldehyde, it is preferred to employ one mole of alkali for every mole of protocatechuic aldehyde.

The solvent employed in this reaction is an important aspect of this invention, inasmuch as it is also a critical feature in the selective separation of the bourbonal from the concomitant co-products and by-products of the ethylation. The solvents employed are chosen from the group of lower aliphatic alcohols consisting of methanol, ethanol, n-propanol and isopropanol, containing from zero to 50% by volume of water. A preferred solvent is a mixture of 75% methanol and 25% water by volume.

The ethylation is effected by heating the demethylation product of step (a), the ethylating agent, the alkali and the solvent, to a temperature from 50° to 200° C. for a period sufficient to cause substantially complete reaction of the reagents. The reaction product will now consist of a solution containing predominantly bourbonal (78%–90%) but also other co-products and by-products of the demethylation of step (a) (such as unreacted vanillin) and the ethylation of step (b) (such as m-hydroxy, p-ethoxybenzaldehyde obtained to a minor extent by the ethylation of the protocatechuic aldehyde in the para position, m,p-diethoxybenzaldehyde obtained to a minor extent by the diethylation of protocatechuic aldehyde, m-methoxy, p-ethoxybenzaldehyde obtained by the ethylation of unreacted vanillin from step (a) and unreacted protocatechuic aldehyde from step (b).

It must be stressed that traces of co-products, by-products, homologues and analogues in bourbonal very seriously interfere with its aroma, flavor and "trueness." A very pure bourbonal, free of these co-products, is desired. For this reason, a simple and efficient selective separation of the bourbonal from the co-products and by-products above enumerated is desirable.

At the conclusion of the ethylation, there will be some precipitation of sodium halide (if an ethyl halide has been employed) which may be separated from the reaction solution (e. g. by filtering or centrifuging). However, this separation is not necessary at this stage but may be combined with a subsequent step.

The pH of the reaction mixture solution (containing bourbonal together with the other co-products and by-products of the ethylation step) is now adjusted to between pH 8.5 and 9.0 (and preferably to pH 8.7) by the addition of sodium hydroxide or a sodium alcoholate. The alkali may be added as a solid, or as a solution in water or a lower aliphatic alcohol. A preferred method of adding the alkali is as a solution in the same solvent employed for the ethylation (e. g. 75% methanol, 25% water by volume).

The bourbonal precipitates selectively as the sodium acid salt of m-ethoxy, p-hydroxybenzaldehyde, whereas the other co-products and by-products above enumerated remain in solution in the solvent. The precipitated sodium acid bourbonal salt is then separated from the solution by filtration or decantation.

*Step (c).—Recovery of bourbonal.*—The precipitate of the sodium acid salt of bourbonal obtained in step (b), preferably after being washed with a little of the same solvent employed in the ethylation (e. g. 75% methanol, 25% water) to free it of adhering products of step (b), is now slurried with a little water, and is acidified to a pH of 6.0 or below, whereupon it is converted to free bourbonal, which may be filtered off, washed and dried in the usual manner.

The acidification may be effected with any desirable acid, such as acetic, formic, hydrochloric, sulfuric or nitric acid. The nature of the acid is not critical.

It may also be found desirable in some cases to react the slurry of the sodium acid bourbonal salt in water with a little more alkali, sufficient to effect complete solution as the neutral sodium salt of bourbonal, thereafter filtering or centrifuging the solution from a small amount of insoluble matter, and thereafter effecting the above described acidification to a pH of 6.0 or below to liberate and precipitate free bourbonal.

The filtered, washed and dried bourbonal thus obtained is highly pure and free of concomitant isomers, homologues and analogues and forms white crystalline needles melting at 75.5°–76.5° C.

The filtrate from step (b) of the process, after separating the sodium acid salt of bourbonal, which contains the co-products and by-products of the reaction, may now be distilled to recover the solvent which may be returned to the process.

The residue of this distillation will contain a mixture of protocatechuic aldehyde; vanillin; m-hydroxy, p-ethoxybenzaldehyde; m-methoxy, p-ethoxybenzaldehyde; m,p-diethoxybenzaldehyde and some bourbonal. In a preferred embodiment of this invention (which is however by no means a critical feature of this invention and which may be disregarded without in any way changing the basis of my invention), this mixture of co-products and by-products may be dealkylated to regenerate and recover protocatechuic aldehyde which is then returned to step (b) of the process for further conversion to bourbonal.

Each of the co-product and by-product compounds above enumerated, as well as the mixture thereof obtained by the distillation of the filtrate from step (b) may be dealkylated smoothly to protocatechuic aldehyde by exactly the same technique employed for the demethylation of vanillin and with the same ether-cleaving reagents. Thus, the mixture obtained from step (b) may be added to the next batch of vanillin being converted to protocatechuic aldehyde, and thus recycled to the process. Alternately, the mixture of co-products and by-product isomers, homologues and analogues obtained from step (b) may be dealkylated in a separate reactor by the same or a similar procedure as is employed for the demethylation of vanillin, and the protocatechuic aldehyde obtained from both sources employed for further ethylation to bourbonal.

In this manner, whereas yields of 65% to 80% of theory of bourbonal may be obtained from vanillin, the recovery and recycling of the co-products and by-products to the process above described increases this yield to 85% to 95% of theory.

The following example is given to define and to illustrate this invention, but in no way to limit it to reagents, proportions or conditions described therein. Obvious improvements will occur to any person skilled in the art. All proportions given are in parts by weight.

*Example*

Vanillin is demethylated by any of the procedures previously described. A typical demethylation product prepared from 153 parts of vanillin (1 mole) and containing 90% of protocatechuic aldehyde and 10% of vanillin is employed in this example.

The demethylation product is now dissolved in 2000 parts of 75% methanol–25% water containing 36 parts of caustic soda (0.9 mole) (mole-for-mole for the protocatechuic aldehyde present), and 99 parts of ethyl bromide (0.9 mole) is added. The reaction mixture is heated in the autoclave at 100°–110° C. for 3 to 4 hours, and is then cooled to room temperature. Precipitated NaBr is filtered off, and the filtrate is adjusted at room temperature to pH 8.7 by the addition with agitation, of a 10% solution of caustic soda in 75% methanol–25% water. After standing for several hours, the precipitate of sodium acid bourbonal is filtered off and is washed on the filterpress with a little 75% methanol-25% water. Filtrate and washings are combined.

The sodium acid bourbonal is slurried with a little water, 5% aqueous caustic soda is added until solution has occurred, and the solution is filtered from a small amount of insolubles. The filtrate is adjusted to pH 6.0 by addition, with good stirring of 50% aqueous sulfuric acid. The precipitated bourbonal is filtered off, washed and dried in a hot air cabinet.

The filtrate from the precipitate of the sodium acid bourbonal is distilled to recover the solvent which is returned to the process. The residue of co-products and by-products is converted to protocatechuic aldehyde by the same procedure employed in demethylation of vanillin.

The yield of bourbonal (m. pt. 76° C.) thus obtained is 77% of theory without recycling of co-products and 92% of theory with the recycling of co-products, based on the vanillin consumed.

Having described my invention, what I claim and desire to protect by Letters Patent is:

1. A process for the selective separation of bourbonal as the sodium salt thereof from a mixture containing bourbonal, vanillin, protocatechuic aldehyde, m-hydroxy, p-ethoxybenzaldehyde, m,p-diethoxybenzaldehyde, said mixture being obtained by the successive demethylation and ethylation of vanillin, which comprises adjusting a solution of these products in a solvent selected from the group consisting of methanol, ethanol, n-propanol and isopropanol containing zero to 50% of water, to a pH between 8.5 and 9.0 with a member of the group consisting of sodium hydroxide and the sodium alcoholates, and separating the insoluble sodium acid salt of bourbonal from the solution of the homologues and analogues.

2. The process of claim 1 effected in a solvent consisting of 75% methanol and 25% water by volume.

References Cited in the file of this patent

UNITED STATES PATENTS

| | | |
|---|---|---|
| 2,100,228 | Tinker et al. | Nov. 23, 1937 |
| 2,387,920 | Lowry | Oct. 30, 1945 |
| 2,477,158 | Weijlard et al. | July 26, 1949 |
| 2,676,191 | Hoatson et al. | Apr. 20, 1954 |

FOREIGN PATENTS

| | | |
|---|---|---|
| 122,851 | Germany | May 27, 1900 |
| 316,444 | Great Britain | Aug. 1, 1929 |
| 622,966 | Germany | Nov. 21, 1935 |